United States Patent [19]
Omura

[11] Patent Number: 5,339,145
[45] Date of Patent: Aug. 16, 1994

[54] TORQUE TRANSMITTING COUPLING AND IMAGE FORMING APPARATUS EMPLOYING SAME

[75] Inventor: Hiroyoshi Omura, Osaka, Japan

[73] Assignee: Mita Industrial Co., Ltd., Osaka, Japan

[21] Appl. No.: 2,905

[22] Filed: Jan. 11, 1993

[30] Foreign Application Priority Data

Jan. 17, 1992 [JP] Japan .................................. 4-00619

[51] Int. Cl.$^5$ ............................................. G03G 15/14
[52] U.S. Cl. .................................. 355/277; 192/48.2; 192/48.5; 355/274
[58] Field of Search ............... 355/274, 277, 203, 204, 355/271, 308–309, 326–328; 271/162, 127; 192/48.2, 48.5

[56] References Cited

U.S. PATENT DOCUMENTS

| | | | |
|---|---|---|---|
| 3,583,315 | 6/1968 | Herbert | 101/96 |
| 3,764,129 | 10/1973 | Yanagawa | 271/156 |
| 3,831,724 | 8/1974 | Baer | 192/56 C |
| 3,850,275 | 11/1974 | Helander | 192/26 |
| 3,987,880 | 10/1976 | Holland-Letz et al. | 192/12 BA |
| 4,840,259 | 6/1989 | Guslits et al. | 192/48.2 |
| 5,220,387 | 6/1993 | Tsunoda et al. | 355/274 |

*Primary Examiner*—A. T. Grimley
*Assistant Examiner*—T. A. Dang
*Attorney, Agent, or Firm*—Beveridge, DeGrandi, Weilacher & Young

[57] ABSTRACT

A one-way coupling transmits torque between a power-transferring spring clutch of a driving system, and a driven system. The coupling comprises a first coupler linked to the spring clutch, and a second coupler connected to the driven system. The power-transmitting direction of the driving system is the direction of spring clutch engagement, and is the rotational direction in which the couplers engage. The first coupler receives torque applied to the driven-system side of the coupling independently of the driving system only when the torque is in the rotational direction engaging the second coupler to the first, which at the same time is in the rotational direction in which the first coupler disengages the spring clutch. Torque on the driven-system side of the coupling in the opposite rotational direction disengages the coupling itself. The coupling is applied to the main driven axle of the positioning mechanism of a copying machine image transfer drum. When the drum is manually withdrawn, the second coupler is turned out of engagement with the first; whereas when the transfer drum is installed, the second coupler turns into coupling engagement with the first, but this twisting on the driving system link via the first coupler disengages the spring clutch. Consequently, when performing the manual mount/dismount operations, the driving system is not engaged, such that no hindering load is brought to bear the driven system side.

18 Claims, 9 Drawing Sheets

TORQUE TRANSMITTING COUPLING AND IMAGE FORMING APPARATUS EMPLOYING SAME

CROSS-REFERENCE TO RELATED APPLICATION

This application is related to copending application Ser. No. 789,647, filed Nov. 8, 1991, commonly assigned with the present invention.

BACKGROUND OF THE INVENTION

The present invention generally relates to a torque transmitting coupling, particularly to a torque transmitting coupling for coupling a spring clutch connected a driving system, and a driven system. The present invention also relates to an image forming apparatus, particularly to an image forming apparatus provided with an image transfer device the positioning of which is controlled by the aforementioned torque transmitting coupling.

The photoconductor drum and image transfer device in the example of a copying machine can be withdrawn from the machine body for maintenance, removing a jammed sheet, etc. Accordingly, the main driven axle of the associated position regulating mechanisms constituting a driven system is coupled with a driving system through a torque transmitting coupling, which typically consists of interlocking couplers, fixed to the drive and driven systems respectively.

A spring clutch is employed in the copying machine for transmitting driving system torque to the main driven axle. The spring clutch inter alia consists of a spring acting on a clutch boss, and it is often disposed between the coupling and the driving system. When driving system torque is applied in the winding direction of the spring, the diameter of the spring contracts, engaging the clutch. Driving system torque applied in the opposite direction unwinds the spring, expanding it diametrically and disengaging the clutch.

If the driven system main axle is turned independently, it can happen that the spring clutch becomes engaged through the torque transmitting coupling, since the spring clutch is engaged and disengaged mechanically. Particularly in the case of the copying machine, while mounting or dismounting the image transfer device and associated elements, external torque is transmitted from the driven system to the driving system, such that the spring clutch becomes engaged, rotating the driving system, hindering the mounting/dismounting operations.

SUMMARY OF THE INVENTION

It is an object of the present invention to facilitate operations to the driven system by eliminating the load secondarily bearing upon it.

It is another object of the present invention to facilitate the operations of mounting and dismounting an image transfer device to and from an image forming apparatus.

A torque transmitting coupling according to an aspect of the present invention couples a driven system to a driving system through a spring clutch, and comprises a first coupling member and a second coupling member. The first coupling member is linked to the spring clutch. The second coupling member is connected to the driven system and transmits torque to the first coupling only when it is turned in one direction.

Wherein the driving system rotates to transmit driving power, the rotational direction is that of spring clutch engagement, and in turn is that in which the first coupling member and second coupling member are engaged, transmitting the driving torque to the driven system.

The first coupling member receives torque applied to the driven-system side of the coupling independently of the driving system only when the torque is in the rotational direction engaging the second coupler to the first, but which in this instance is the rotational direction in which the first coupler disengages the spring clutch.

If rotational force is applied to the driven system side in the direction of spring clutch engagement, the second coupling member turns in the direction uncoupling it from the first coupling. Consequently, secondary load from the driving system is not brought to bear on the driven system.

An image forming apparatus according to another aspect of the present invention comprises an image forming section including an image retainer for retaining an image thereon, a sheet supply means for supplying sheets to the image forming section, a transfer unit which can be pressed against and be separated from the image retainer, for transferring the image on the image retainer surface onto the sheet, a positioning control mechanism for controlled positioning of the transfer unit in order to adjust a space between the transfer unit and the image retainer, and a torque transmitting mechanism for transmitting the torque of the driving system through a spring clutch to the position control mechanism.

The torque transmission mechanism includes a first coupling member linked to the spring clutch, and a second coupling member connected with the position control mechanism. The second coupling member transmits torque to the first only wherein it is one rotational direction.

When the transfer unit is to be withdrawn out of the machine body of the image forming apparatus, it is separated from the image retainer through controlled positioning by the positioning control mechanism. Although torque is transmitted from the positioning control mechanism to the torque transmitting mechanism, it is not transmitted to the driving system because the torque transmitting mechanism transmits torque only when applied in the opposite rotational direction wherein it disengages the spring clutch, thereby facilitating the withdrawal.

The foregoing and other objects and advantages of the present invention will become more fully apparent from the following detailed description.

DESCRIPTION OF THE PREFERRED EMBODIMENTS

Figure 1:
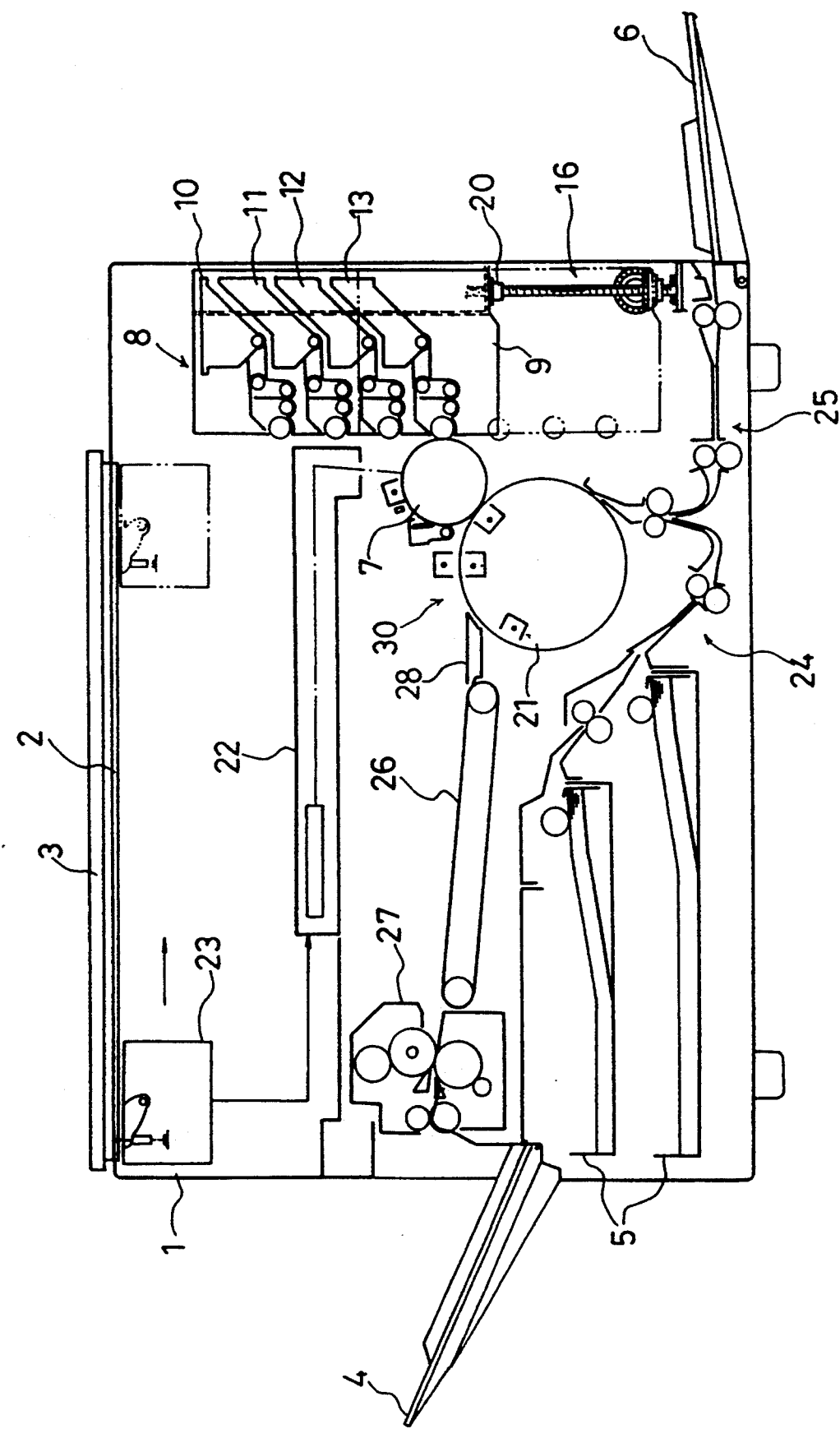
FIG. 1 is a schematic elevational view of a full-color copying machine in which a torque transmitting coupling according to an embodiment of the present invention is incorporated.

FIG. 1 shows a schematic view of a full-color copying machine incorporating an embodiment according to the present invention.

In reference to FIG. 1, an original retainer 2 on which an original is retained is disposed in an upper portion of a copying machine body 1, and a raisable original cover 3 is provided over the upper surface of the original retainer 2. A copy tray 4 is disposed on the left side of the body 1, and a plurality of sheet feed cassettes 5 are disposed detachably in a left bottom portion of the body 1. A bypass feed tray 6 is disposed on the right side of the body 1.

A photoconductor drum 7 is provided inside the copying machine body 1. A transfer unit 30 including a transfer drum 21 is provided adjacent to the photoconductor drum 7. A charger, a sheet separating unit, and a cleaning unit, as well as a developing section 8 including vertically arranged developing units 10, 11, 12 and 13, are further provided in the region surrounding the photoconductor drum 7. These developing units 10 through 13 are fixed to a frame 9, which is vertically movable by means of a moving mechanism 16 which includes a stepping motor, a ball screw, a nut and so on.

The transfer drum 21 is disposed under and alongside the photoconductor drum 7. A laser unit 22 is disposed above the photoconductor drum 7. A laser beam from the laser unit 22 irradiates the upper surface of the photoconductor drum 7. A reader 23 comprising CCDs is disposed under the original retainer 2. The reader 23 is conveyed crosswise relative to the figure, thereby to scan an original placed on the original retainer 2. Image information obtained by the reader 23 is transmitted as an electric signal to the laser unit 22.

Sheet transport paths 24 and 25 are provided under the transfer drum 21 between the feed cassettes 5 and the bypass feed tray 6. The sheet transport paths 24 and 25 include sheet guides and feed rollers. A discharged sheet transport path 26 and an image fixing unit 27 are provided between the transfer drum 21 and the copy tray 4. A separation claw 28, which separates the printing sheet from the transfer drum 21, is provided between the transfer drum 21 and the discharged sheet transport path 26.

Figure 2:
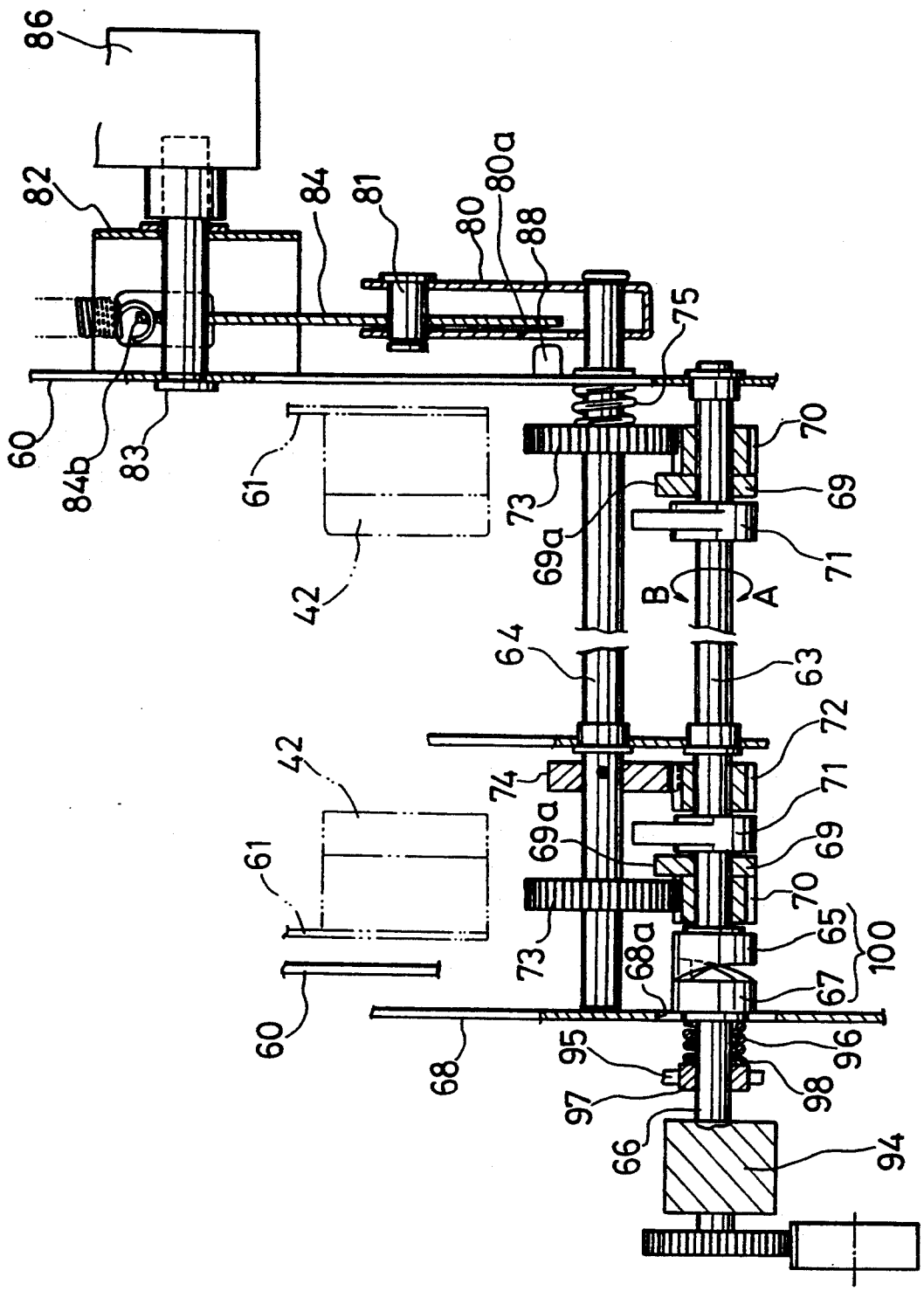
FIG. 2 is a fragmentary side view of pressing and regulating mechanisms of a transfer unit.
Figure 3:
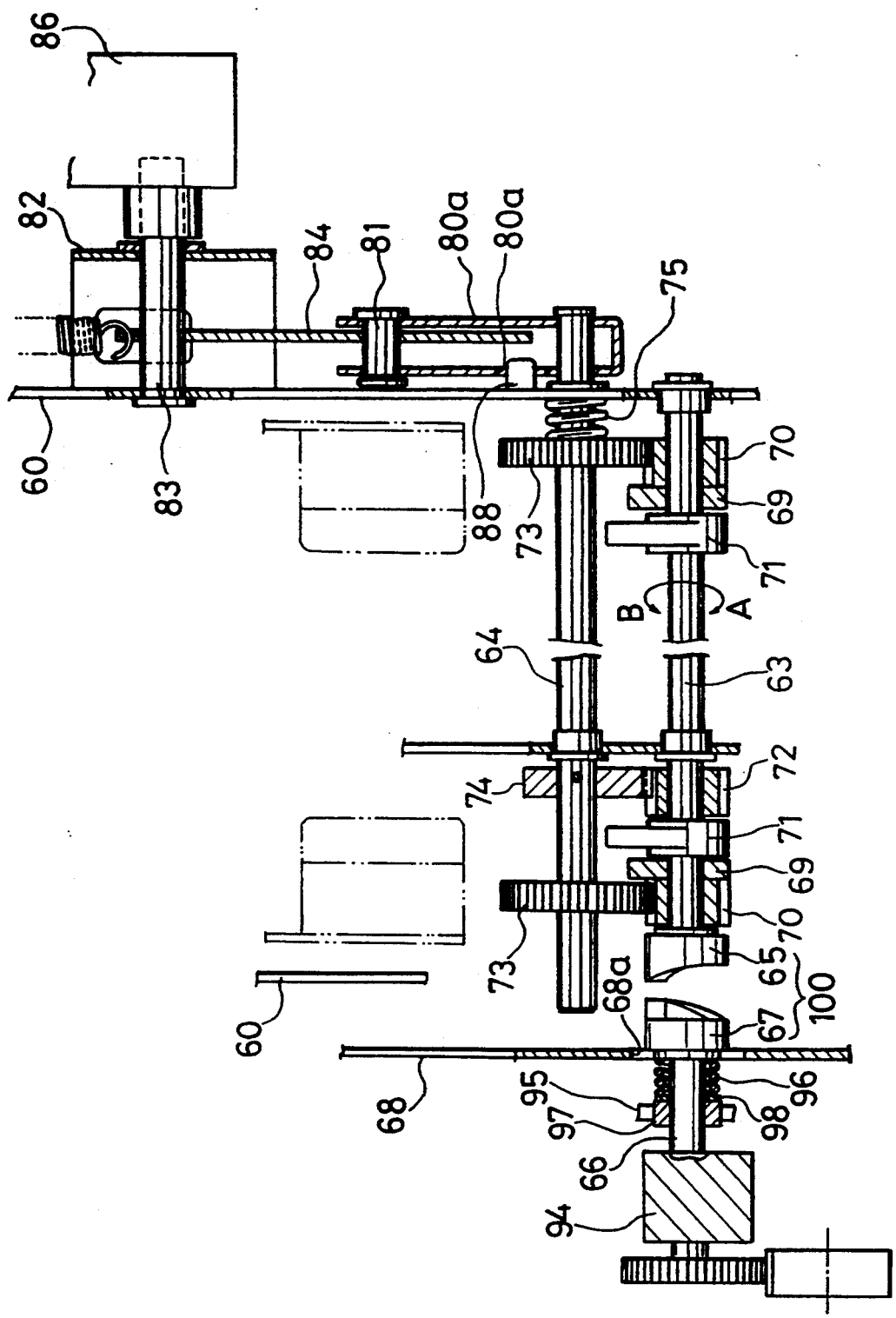
FIG. 3 is a view corresponding to FIG. 2 of the transfer unit mechanisms in dismount.

FIGS. 2 and 3 show position control mechanisms, as a driven system of the transfer unit, in partly sectional views leftward of the copying machine. The right side in FIGS. 2 and 3 corresponds to the front of the machine, and the left side in these figures corresponds to the rear.

Figure 6:
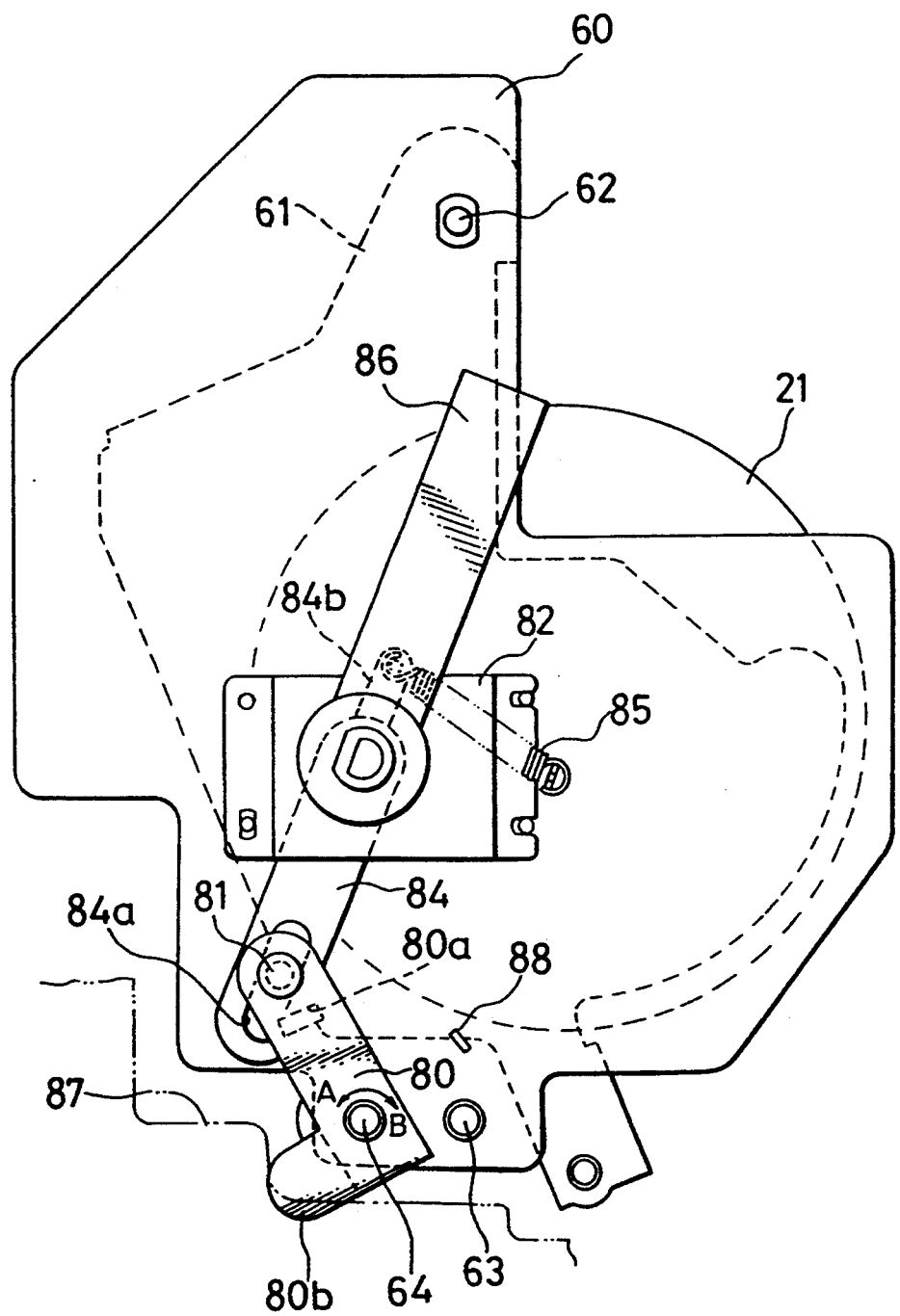
FIG. 6 is an external front view of the transfer unit.

The transfer unit 30 includes an outer frame 60. An inner frame 61 which supports the transfer drum 21 is disposed within the outer frame 60. The inner frame 61 has upper portions pivotally connected to the outer frame 60 on a support shaft 62, as shown in FIG. 6.

First and second rotator shafts 63 and 64 are rotatably mounted in the outer frame 60. The rotator shafts 63 and 64 are disposed below the transfer drum 21, in parallel with its axle. A second coupling member 65 is fixed at the rear end of the first rotator shaft 63. A drive shaft 66 is provided in a driving system of the copying machine body 1, and a first coupling member 67 connectable with the second coupling member 65 is fixed to the front end of the drive shaft 66. The first coupling member 67 projects frontward through an opening 68a formed in a rear plate 68 of the copying machine body 1. The first coupling member 67 and the second coupling member 65 compose a torque transmitting coupling 100 according to an embodiment of the present invention.

Figure 4:
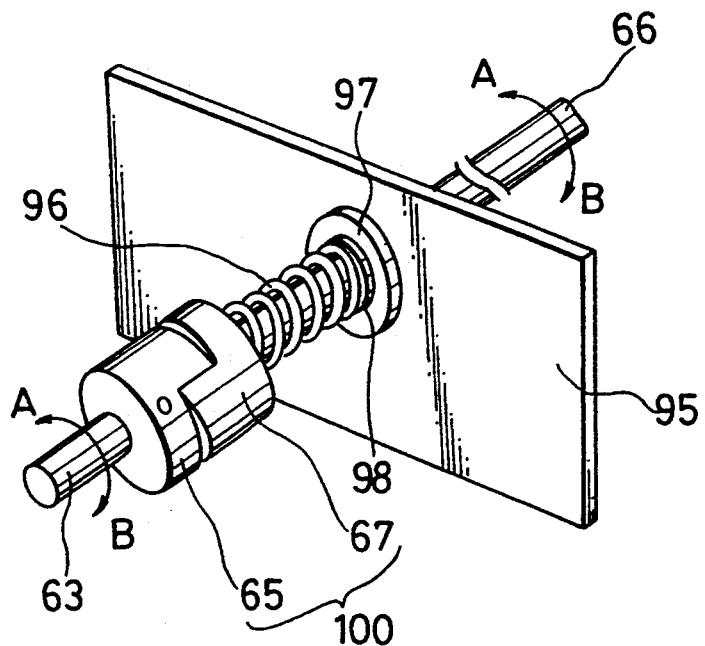
FIG. 4 is a perspective view of a torque transmitting coupling.
Figure 5:
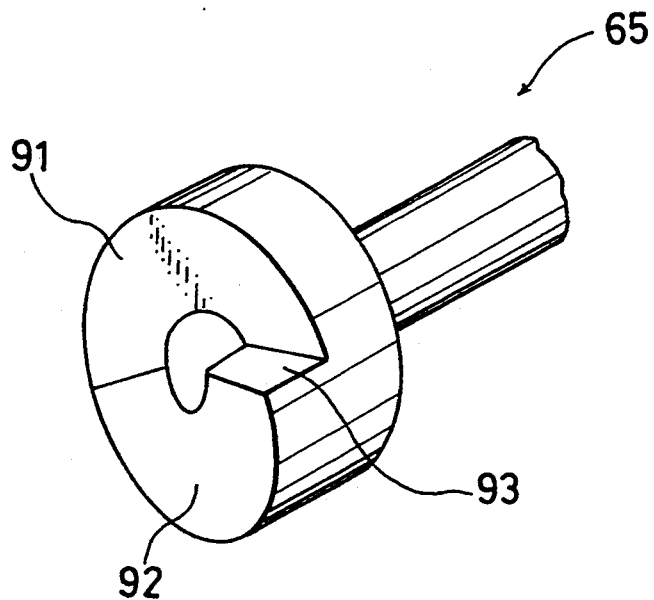
FIG. 5 is a perspective view of a second coupling member.

Referring to FIG. 4 and FIG. 5, the first coupling member 67 and the second coupling member 65 of the torque transmitting coupling 100 will be detailed.

As shown in FIG. 5, the coupling face of the second coupling member 65 is flat along surface 91, which is approximately semicircular in extension and which meets sloped surface 92, rising therefrom counterclockwise and ending in abutment shelf 93, perpendicular to the flat surface 91. Likewise, a flat surface 91, a sloped surface 92 and an abutment shelf 93 form the coupling face of the first coupling member 67. As shown in FIG. 4, the abutment shelves 93 of both coupling members are in mutual contact wherein they are in engagement when the drive shaft 66 turns in direction A.

As shown in FIG. 2, a spring clutch 94 connected to the driving system is joined to the end of the drive shaft 66. The clutch 94 becomes engaged through the diametrical contraction of its spring when it is driven by the driving system in direction A of FIGS. 2 and 3; and it becomes disengaged through the diametrical expansion thereof when it is driven in direction B opposite. Located between the first coupling member 67 and the spring clutch 94 is a second rear plate 95. Located between the second rear plate 95 and the first coupling member 67 is a coil spring 96, one end of which contacts the rear surface of the first coupling member 67 and the opposite end of which contacts a spring seat 98 fixed to a bearing 97 mounted to the second rear plate 95. The coil spring 96 biases the first coupling member 67, which is movable in the axial direction, toward the second coupling member 65.

Regulator cams 69 are provided on the front and rear ends of the first rotator shaft 63. Each regulator cam 69 is integrally formed with a contact projection 69a and a gear 70. The cams 69 and the associated gears 70 are rotatably mounted on the first rotator shaft 63. Presser cams 71 are provided in the unit adjacent to the respective regulator cams 69. Each of the presser cams 71 is sectoral in shape, and is fixed to the first rotator shaft 63 so as to rotate together with it. A first disengage gear 72 is provided adjacent to the presser cam 71 rearward of the machine and is fixed to the rotator shaft 63. Each regulator cam 69 is disposed such that it can come into contact with a corresponding cam following portion of the inner frame 61, and the presser cams 71 are disposed such that they likewise can contact corresponding plate cams 42.

The second rotator shaft 64 is provided with gears 73 which are fixed to the front and rear ends of the shaft 64 and are engaged with the gears 70 so as to drive the regulator cams 69. A second disengage gear 74 which engages with the corresponding first disengage gear 72 is fixed to the second rotator shaft 64. The second rotator shaft 64 is supported so as to be shiftable machine-depthwise, and is rotatable with respect to the outer frame 60. A spring 75 which impels the second rotating shaft 64 toward the rear of the machine is disposed between the inner wall of the outer frame 60 in the front of the machine and the facing end of the front gear 73. Consequently, when the transfer unit is mounted in the copying machine body as indicated in FIG. 2, the second coupling 65 on the rear end of the first rotator shaft 63 engages with the first coupling member 67, and the rear end of the second rotator shaft 64 is pushed against the rear side plate 68 of the machine body 1. Therein, the second rotator shaft 64 is pressed toward the front of the machine in opposition to the impelling force of the spring 75.

A rotatory bracket 80, formed as a U in vertical cross section, is fixed onto the front end of the second rotator shaft 64. A pin 81 is provided extending through both upper branches of the U-shaped rotatory bracket 80. The portion of the bracket 80 nearer to the outer frame 60 and below the pin 81 has a slot 80a, as shown in FIG. 6. A lever support bracket 82 is fixed onto the frontward surface of the outer frame 60. The lever support bracket 82 is U-shaped in horizontal cross section, and a support pin 83 is inserted through its central portion. The support pin 83 extends from inside the outer frame 60 toward the front of the machine, and its front end projects from the lever support bracket 82. A rotatory plate 84 is fixed rigidly to the support pin 83. An elongate hole 84a is formed in a lower end portion of the rotatory plate 84, and the pin 81 passes therethrough.

In the above-described structure, the rotatory plate 84 turns together with the support pin 83, and the rotatory bracket 80 linked thereto by means of the pin 81 through the hole 84a also turns, thereby rotating the second rotator shaft 64. A tab 84b projects from the upper portion of the rotatory plate 84, and a return spring 85 for bringing the rotatory plate 84 to its initial position is provided between the tab 84b and the outer frame 60. A lever 86 is attached to the forward-projecting portion of the support pin 83, through the agency of which the second rotator shaft 64 can be turned.

Figure 7:
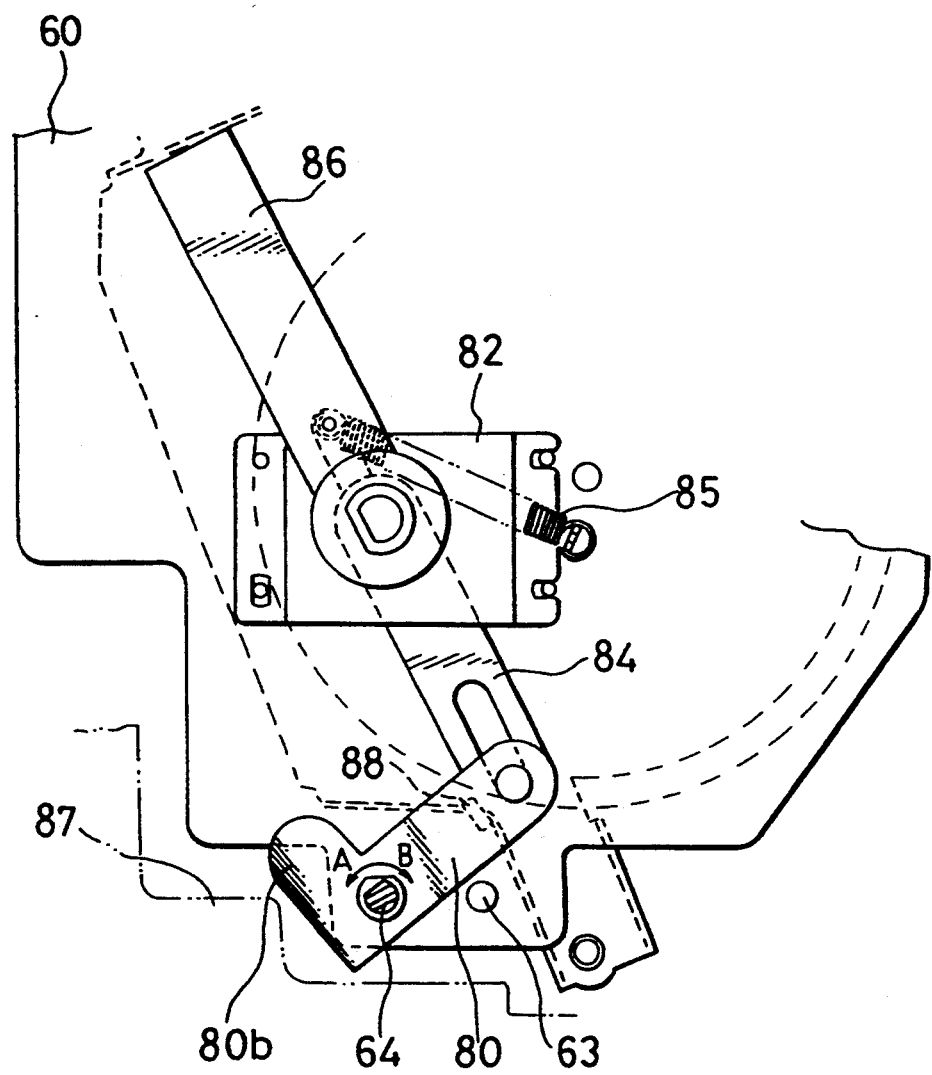
FIG. 7 is a partial view corresponding to FIG. 6 illustrating mounting and dismounting operations.

FIG. 6 shows the state in which the lever 86 is in the mount position, and FIG. 7 shows the state in which the lever 86 is in the dismount position. As shown in FIG. 6, a projection 88 is formed in a central lower portion of the outer frame 60, wherein when the lever is put into the dismount position, the slot 80a of the rotatory bracket 80 engages with the projection 88. A removal control tab 80b is formed in the lower portion of the rotatory bracket 80 and projects in its respective width direction. As can be seen from FIGS. 6 and 7, when the lever 86 is in the mount position as shown in FIG. 6, the removal control tab 80b is caught against the a frame 87 of the machine body 1, whereby removal of the transfer drum 21 is prevented. Conversely, when the lever 86 is in the dismount position, the rotatory bracket 80 is turned through a predetermined angle, and the removal control tab 80b is apart from the frame 87, allowing the transfer drum 21 to be removed from the body 1.

Figure 8:
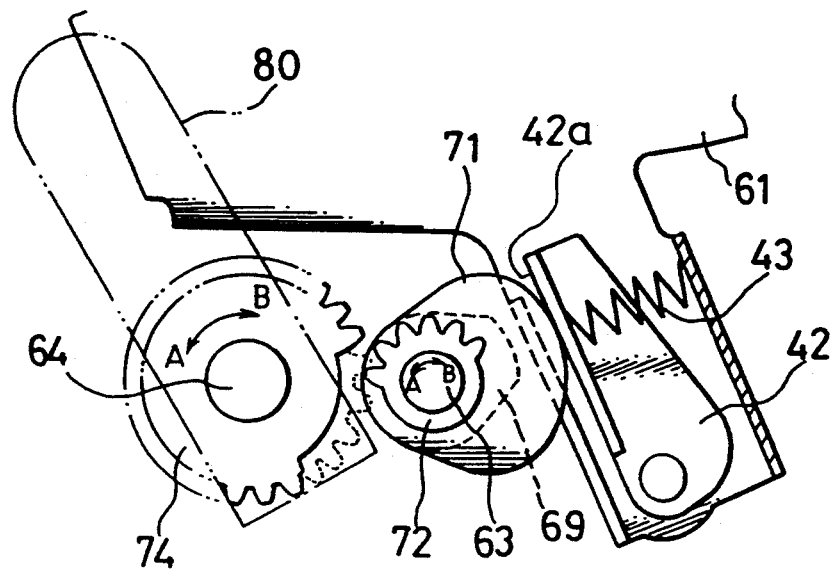
FIGS. 8–11 are fragmentary front views pertaining to the positioning of the transfer unit.
Figure 9:
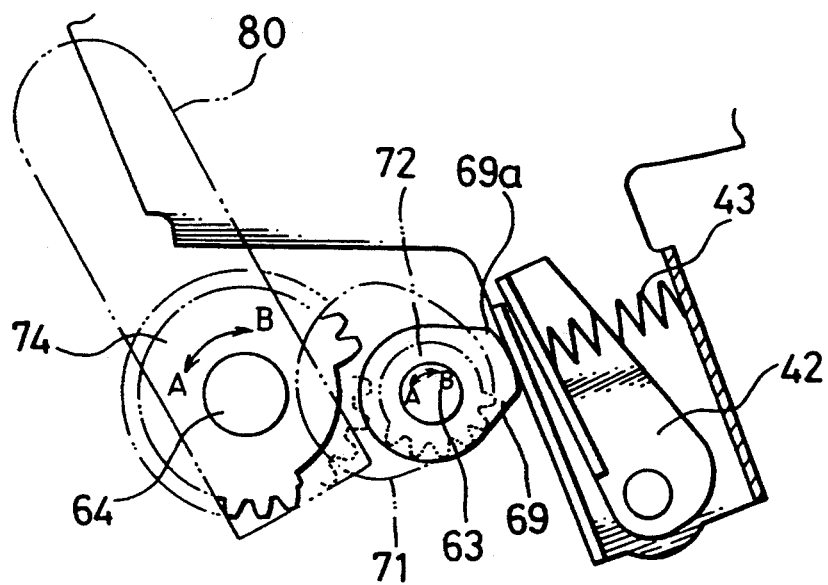
Figure 10:
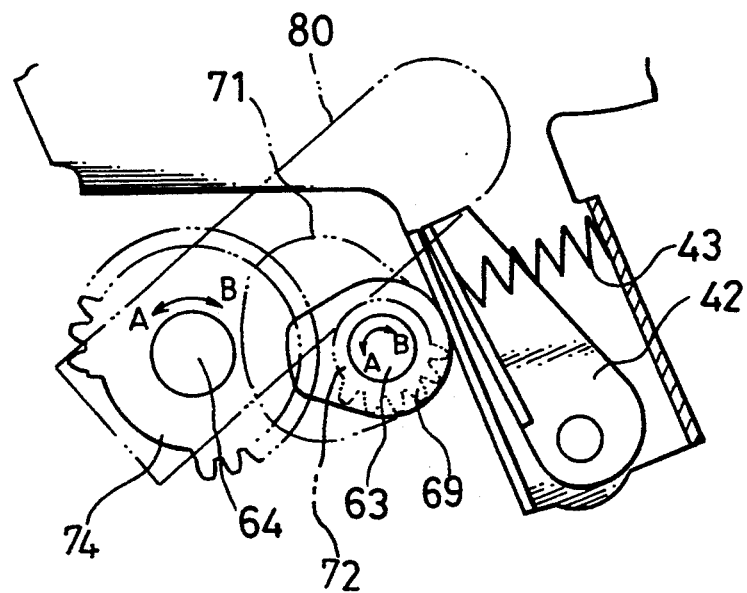

FIGS. 8–10 show engagement of the regulator cams 69, presser cams 71, and disengage gears 72 and 74 on the first and second rotator shafts 63 and 64. As shown in FIG. 8, the first disengage gear 72 is provided only partially with teeth, and the second disengage gear 74 has a gap in a portion of its outer circumference. Thus, the second rotator shaft 64 is not turned by rotation of the first rotator shaft 63 and the first disengage gear 72 when the lever 86 is in the mount position, in which the rotatory bracket 80 is in the position as shown in FIG. 8.

Plate cams 42, and a spring 43 impelling each cam 42, are provided in a lower portion of the inner frame 61.

Operation hereof will be described in the following.

When an original is placed on the original retainer 2 and a print key is pressed, a printing sheet is fed from the feed cassette 5 to the transfer drum 21. The reader 23 scans the original on the original retainer 2, whereupon information read by the reader 23 is transmitted to the laser unit 22. The beam of the laser unit 22 irradiates the photoconductor drum 7 in correspondence with the image information, whereby an electrostatic latent image in accordance with the image information is formed on the photoconductor drum 7. Subsequently, an image of each color is developed by each of the respective developing units 10 through 13, and is transferred onto the printing sheet on the transfer drum 21.

If the printing sheet size is small, each of the images developed by the developing units 10 through 13 is transferred onto the printing sheet through one rotation of the transfer drum 21, so that the transfer operation is completed in four rotations of the transfer drum 21. Then, the printing sheet having the transferred image is separated from the transfer drum 21 by means of the separation claw 28, and is transported to the fixing unit 27 through the discharged sheet transport path 26. The printing sheet having the image fixed by the fixing unit 27 is discharged onto the copy tray 4.

If the size of the printing sheet is large, e.g., size A3, the printing sheet will be wound around nearly the entire circumference of the transfer drum 21. In this case, an image of one color is transferred onto the transfer drum 21 by one rotation of the drum 21, then the drum 21 idles for another rotation, during which no transferal occurs. During the idle rotation of the drum 21, the respective components are moved into predetermined positions, so as to be prepared for the transfer of an image of another color through the subsequent rotation. The image of the subsequent color is transferred during the rotation subsequent to the idle rotation.

When the transfer unit is mounted in the copying machine body 1, the second coupling member 65 on the rear end of the first rotator shaft 63 is engaged with the first coupling member 67 of the copying machine body 1. The rear end of the second rotator shaft 64 is pressed against the rear plate 68 of the machine body 1, and thus is pressed frontward, in opposition to the impelling force of the spring 75. In this state, the projection 88 is disengaged from the slot 80a of the rotatory bracket 80, and the lever 86 is retained in the mount position, as shown in FIG. 6, by means of the return spring 85. The rotatory bracket 80 and rotatory plate 84 are also in the positions shown in FIG. 6. In this state, the removal control tab 80b of the lower end of the rotatory bracket 80 is stopped by the frame 87 of the machine body 1, whereby the transfer unit is prevented from being drawn out.

In this mount position, when an image is to be transferred onto the printing sheet on the transfer drum 21, the regulator cams 69 and presser cams 71 are in the positions as shown in FIG. 8, wherein the presser cams 71 press against cam surfaces 42a of the associated plate cams 42. Consequently, the inner frame 61 of the transfer drum 21 is driven counterclockwise around the support shaft 62 by agency of the spring 43, whereby the transfer drum 21 is pressed against the photoconductor drum 7. In this state, the image on the photoconductor drum 7 is transferred onto the printing sheet wound on the transfer drum 21.

After one rotation of the transfer drum 21, a solenoid (not shown) of the driving system is activated, whereby the first rotator shaft 63 is turned 180° in direction A through the drive shaft 66 and couplings 67 and 65. The presser cams 71 rotate through 180° in direction A thereby from the position shown in FIG. 8 to the disengage position shown in FIG. 9. As a result, the pressing action of the presser cams 71 is released, and the inner frame 61 supporting the transfer drum 21 swings clockwise around the support shaft 62 under the weight of the transfer drum 21 and the related elements. Subsequently, the cam following portion of the inner frame 61 is stopped by the projection 69a of the regulating cam 69, at a position wherein the transfer drum 21 is separated from the photoconductor drum 7 by a predetermined distance and is prevented from turning further.

In consequence, a gear train of the photoconductor drum 7 and the gearing portion of the transfer drum 21 remain partially engaged with each other, and the torque from the photoconductor drum 7 continues to be transmitted to the transfer drum 21, which thus continues to rotate.

During the idle rotation of the drum 21, the reader 23 goes back to its home position and a given developing unit among the developing units 10 to 13 is moved in to the developing location.

In order to transfer an image of a subsequently developed color, the solenoid of the driving system is deactivated, whereby the first rotator shaft 63 turns by 180° by means of the driving shaft 66, coupling members 67 and 65 and associated elements, in the same manner as described above. As a result, the presser cams 71 are turned from the position shown in FIG. 9 to the pressing position as shown in FIG. 8, whereby the inner frame 61 turns counterclockwise around the support shaft 62 through agency of the plate cams 42 and springs 43, thus pressing the transfer drum 21 against the photoconductor drum 7. In this state, the image developed in the subsequent color is transferred onto the printing sheet.

The above-described operation is repeated in order to transfer the respective color images onto the printing sheet on the transfer drum 21, which is idled during the intervals in which the developer colors are switched.

The removal of the transfer drum 21 after the machine is stopped will be described. Presser cams 71 are in the disengage position as shown in FIG. 9.

In order to remove the transfer unit, the lever 86 is turned counterclockwise into the dismount position as shown in FIG. 9, whereupon the rotatory plate 80 is turned clockwise and the removal control tab 80b turns upward. Consequently, the removal control tab 80b is no longer caught against the frame 87, and the transfer unit may be drawn out. In this state, when the lever 86 is drawn out frontward, the first rotator shaft 63 becomes detached from the driving system as shown in FIG. 3. The rear end of the second rotator shaft 64 becomes separated from the rear plate 68 of the machine body 1, and the second rotator shaft 64 is pushed rearward by the impelling force of the spring 75, which meanwhile draws the rotatory plate 80 on the front end of the second rotator shaft 64 rearward. As a result, the slot 80a of the rotatory bracket 80 becomes seated on the projection 88 of the outer frame 60. Thus, the lever 86 is kept in the dismount position, against the tension of the return spring 85.

As a result of bringing the lever 86 into the dismount position, the second rotator shaft 64 is turned in direction B through the rotatory plate 84 and the rotatory bracket 80. In consequence, the regulator cams 69 are turned through essentially 180° by agency of the gears 73 and 70, according to their gear ratio, whereby the cams 69 are brought into the disengage position as shown in FIG. 10. Thus, the regulator cams 69 ride off the cam following portion of inner frame 61, whereby the inner frame 61 swings clockwise under its own weight, namely the weight of the transfer drum 21 and related elements. The transfer drum 21 is thus sufficiently separated from the photoconductor drum 7, such that the entire transfer unit 30 may be drawn out frontward of the machine, while guaranteeing that collision between the transfer drum 21 and the photoconductor drum 7 will be avoided.

In order to mount the transfer drum 21 together with the frames into the machine body 1, the lever 86, in the dismount position, is pushed toward the machine body 1. When the lever 86 reaches the predetermined position, the second rotator shaft 64 presses against the rear plate 68 of the machine body 1, and is pushed frontward. Thereupon, the projection 88 disengages from the slot 80a of the rotary bracket 80. As a result, the lever 86 is brought into the mount position by the return force of the return spring 85. The second rotator shaft 64 is simultaneously turned in direction A by action of the rotary bracket 80 and plate 84, and the regulator cams 69 are brought into the retaining position as shown in FIG. 9 by agency of the gears 73 and 70. Thus the transfer drum 21 is positioned close to the photoconductor drum 7.

When the second rotator shaft 64 turns in direction A from FIG. 10 state, the first rotator shaft 63 does not turn, because, likewise as explained before, the second disengaging gear 74 and the first disengage gear 72 are not engaged. Consequently, the pressing cam 71 remains located in the disengagement position shown in FIGS. 9 and 10.

A handling procedure in the instance of a paper jam will now be described.

Figure 11:
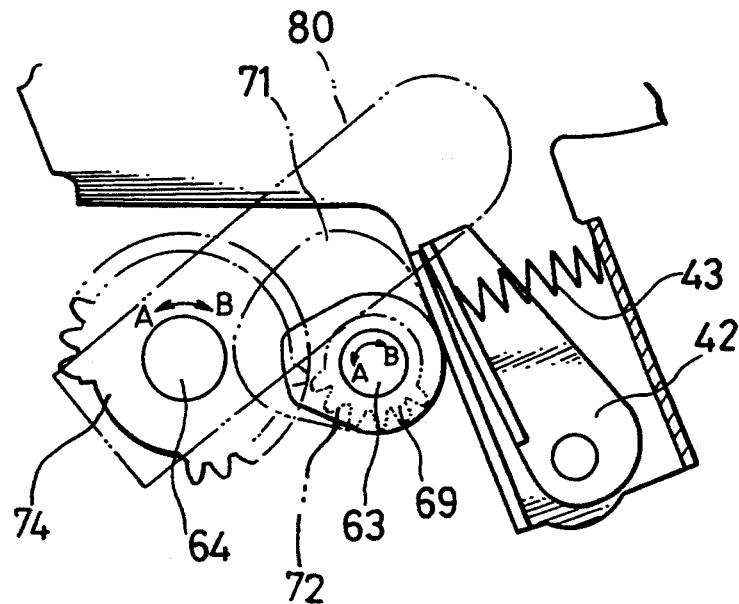
Figure 12:
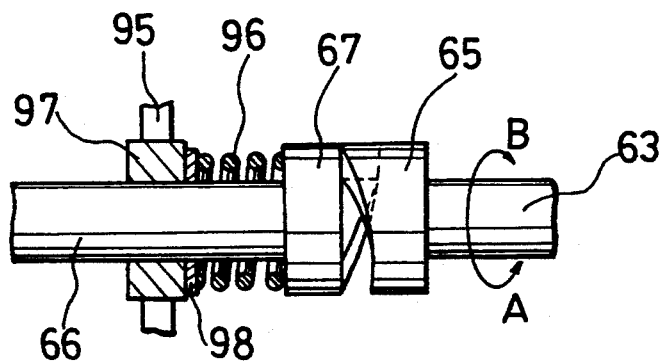
FIGS. 12 and 13 are top views illustrating disengagement rotation of the torque transmitting coupling.
Figure 13:
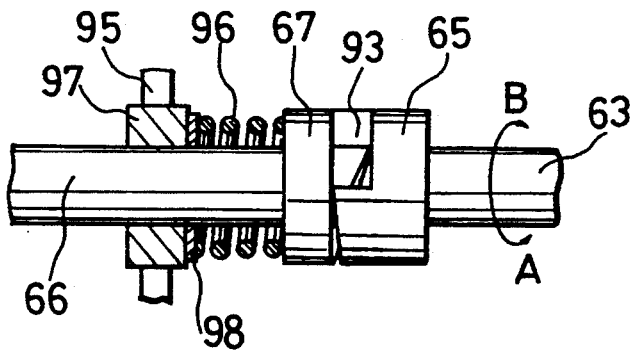

Should a paper jam occur during a transfer operation, for which the regulating elements of the transfer unit 30 will be positioned as shown in FIG. 8, and the copying machine stops, the transfer drum 21 will be in the state in which it is pressed against the photoconductor drum 7. The lever 86 is then turned into the dismount position for the purpose of remedying the jam. This brings the teeth of the second disengage gear 74 into engagement with the teeth of the first disengage gear 72, whereby the presser cams 71 are rotated essentially 180° according to the gear ratio therein, and are swung into the disengage position as shown in FIG. 11. By the foregoing operation, the first rotator shaft 63 is thus turned in direction A, as shown in FIG. 12 and FIG. 13. Rotation of the first rotator shaft 63 turns the second coupling member 65° through 90° relative to the first coupling member 67 in direction A such that the former rides off the latter (from the state shown in FIG. 12 to that of FIG. 13).

Accordingly, as the first rotator shaft 63 is turned in direction A (the direction of spring clutch 94 engagement) relative to the drive shaft 66 when the transfer drum 21 is drawn out after a paper jam occurs during a transfer operation, the driving system cannot be counter-turned through the spring clutch 94. Thus, it is easy to move the lever 86 into mount and dismount positions.

When the transfer unit is mounted into the main body 1 after the jam is remedied, the lever 86 is automatically returned to the mount position by the return spring 85. Simultaneously the first rotator shaft 63 turns in direction B (from FIG. 11 to FIG. 8) via the engagement of the second disengage gear 74 and the first disengage gear 72. Also, the second coupling member 65 turns in direction B from the FIG. 13 state, such that the abutment shelves of the first coupling member 67 and second coupling member 65 are brought into mutual contact, as shown in FIG. 12.

If a paper jam occurs during the idle running of the transfer drum 21, the copying machine stops in the state to which FIG. 9 correlates. When the lever 86 is turned from the mount position into the dismount position, the regulator cams 69 rotate by agency of the gears 73 and 70. Meanwhile, the toothed portion of the first disengage gear 72 is turned downward, wherein it cannot engage with the associated second disengaging gear 74 even if the gear 74 were to turn. Consequently, the presser cams 71 are kept in the disengage position as shown in FIG. 9, as the regulating elements are finally brought into the position shown in FIG. 10. Thus, the transfer drum 21 is sufficiently separated from the photoconductor drum 7, allowing the unit to be smoothly dismounted so that the jammed sheet can be removed. Furthermore, the first rotator shaft 63 does not turn because the first disengage gear 72 and the second disengage gear 74 are not engaged.

When the transfer drum 21 is brought from the mounted position into the FIG. 10 state and the second rotator shaft 64 turns, the first rotator shaft 63 is not rotated therein either because the first disengage gear 72 and the second disengage gear 74 are not engaged.

According to the foregoing, wherein the driven system is turned in the dismounting direction, such that the turning direction is the same as the spring clutch engagement direction (direction A), the torque transmitting coupling 100 coupling the spring clutch and the driven system is turned in the direction in which it becomes disengaged, such that counteractive load is not transmitted to the driven system.

Modification

The structure of the torque transmitting coupling which is engaged in one rotational direction and is disengaged in the opposite rotational direction is not limited to the above-described embodiment of the present invention.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A torque transmitting coupling for coupling a spring clutch, connected to a driving system, with a driven system, said transmitting coupling comprising:
   a first coupling member connected to said spring clutch;
   a second coupling member connected to said driven system;
   a drive shaft of said driving system, said drive shaft having one end to which said first coupling member is fixed, and an opposite end to which said spring clutch is attached;
   a driven shaft of said driven system, said driven shaft having one end to which said second coupling member is fixed; and
   operation means for turning said second coupling member; wherein
   coaxial engagement of said first and second coupling members is such that torque applied to said driven system independently of said driving system is transmitted by said second coupling member to said first coupling member when the torque is applied during rotation in only one rotational direction, and not transmitted to said first coupling member during rotation in a rotational direction opposite said one direction, said one rotational direction being a direction in which said spring clutch becomes disengaged from connection to said driving system;
   said spring clutch is disengaged when said operation means turns said second coupling member in said direction in which said second coupling member transmits torque to said first coupling member;
   a coupling face of each of said first and second couplings is partly formed of a flat surface, which flat surface meets a surface sloping circumferentially therefrom in a direction of increasing axial dimension of each said coupling, ending in an abutment shelf substantially perpendicular to and meeting said flat surface; and
   said abutment shelves of both coupling members are formed such that they can be brought into mutually abutting contact.

2. A coupling according to claim 1, further including:
   a frame supporting said drive shaft, wherein said drive shaft is rotatable and axially slidable; and
   an urging means, located between said frame and said first coupling member, for urging said first coupling member toward said second coupling member.

3. An image forming apparatus comprising:
   an image forming section, including an image retainer for superficially retaining an image;
   means for supplying a sheet to said image forming section;
   an image transfer device, which can be pressed against and is movable away from said image retainer, for transferring the image superficially retained on said image retainer onto a sheet supplied by said sheet supply means, said image transfer device being removable from a main body of said image forming apparatus;
   means for controllably positioning said image transfer device so as to regulate a distance between said image transfer device and said image retainer, said positioning means controllably positioning said image transfer device by assuming a first position wherein said image transfer device is pressed against said image retainer, and second and third positions wherein said image transfer device is spaced from said image retainer by a first distance and a second distance, greater than said first distance, respectively;
   manipulation means, movable between a mount position and a dismount position, for mounting said image transfer device into and dismounting it from the main body of said image forming apparatus;
   connecting means connecting said manipulation means with said positioning means such that said positioning means is compelled to assume the second position wherein said manipulation means is in the mount position, and to assume the third position wherein said manipulation means is in the dismount position; and a torque transmitting coupling for transmitting torque transmitted from a driving system through a spring clutch to said positioning means, said coupling including, a first coupling member connected to said spring clutch, and a second coupling member connected to said driven system; wherein coaxial engagement of said first and second coupling members is such that torque applied to the driven system independently of the driving system is transmitted by said second coupling member to said first coupling member when the torque is applied during rotation in only one rotational direction, and not transmitted to said first coupling member during rotation in a rotational direction opposite thereto.

4. An image forming apparatus according to claim 3, wherein the rotational direction in which said driven system torque is transmitted through said second coupling to said first coupling is a direction in which said spring clutch becomes disengaged from connection to said driving system.

5. An image forming apparatus according to claim 4, further including an operation means which turns said second coupling member.

6. An image forming apparatus according to claim 5, wherein said spring clutch is disengaged when said operation means turns said second coupling member in the direction in which said second coupling member transmits torque to said first coupling member.

7. An image forming apparatus according to claim 6, further including:

a drive shaft of said driving system, to one end of which said first coupling member is fixed, and to an opposite end of which said spring clutch is attached;

a driven shaft of said driven system, to one end of which said second coupling member is fixed, wherein said driven shaft is turnable by said operation means;

a frame supporting said drive shaft, wherein it is rotatable and axially slidable; and an urging means, located between said frame and said first coupling member, for urging said first coupling member toward said second coupling member.

8. An image forming apparatus comprising:

an image forming section, including an image retainer for superficially retaining an image;

means for supplying a sheet to said image forming section;

an image transfer device, which can be pressed against and is movable away from said image retainer, for transferring the image superficially retained on said image retainer onto a sheet supplied by said sheet supply means;

means for controllably positioning said image transfer device so as to regulate a distance between said image transfer device and said image retainer; and a torque transmitting coupling for transmitting torque transmitted from a driving system through a spring clutch to said positioning means, said coupling including, a first coupling member connected to said spring clutch, and a second coupling member connected to said driven system;

a drive shaft of said driving system, said drive shaft having one end to which said first coupling member is fixed, and an opposite end to which said spring clutch is attached;

a driven shaft of said driven system, said driven shaft having one end to which said second coupling member is fixed;

a frame supporting said drive shaft, wherein said drive shaft is rotatable and axially slidable;

an urging means, located between said frame and said first coupling member, for urging said first coupling member toward said second coupling member; and an operation means for turning said driven shaft and thereby said second coupling member wherein coaxial engagement of said first and second coupling members is such that torque applied to the driven system independently of the driving system is transmitted by said second coupling member to said first coupling member when the torque is applied during rotation in one rotational direction, and not transmitted to said first coupling member during rotation in a rotational direction opposite said one direction, said one rotational direction being a direction in which said spring clutch becomes disengaged from connection to said driving system;

said spring clutch is disengaged when said operation means turns said second coupling member in the direction in which said second coupling member transmits torque to said first coupling member;

a coupling face of each of said first and second couplings is partly formed of a flat surface, which flat surface meets a surface sloping circumferentially therefrom in a direction of increasing axial dimension of each said coupling, ending in an abutment shelf substantially perpendicular to and meeting said flat surface; and said abutment shelves of both coupling members are formed such that they can be brought into mutually abutting contact.

9. An image forming apparatus according to claim 3, further including position retaining means for retaining said positioning means in the third position.

10. An image forming apparatus according to claim 9, further including means for returning said manipulation means to the mount position when said image transfer device is mounted into said image forming apparatus.

11. An image forming apparatus according to claim 10, further including a first frame supporting either of two ends of said image transfer device, and a second frame pivotally supporting a portion of said first frame; wherein said positioning means of said image forming apparatus includes a regulator cam, rotatably supported by said second frame, which regulates a distance of the movement of said first frame;

said manipulation means comprises an operation lever; and said connecting means is a member which transmits turning of said operation lever to said regulator cam.

12. An image forming apparatus according to claim 11, wherein said manipulation means comprises a member rotatably by said operation lever; and said position retaining means includes a slot in said rotatable member, and a projection formed in said second frame and engageable with said slot of said rotatable member when in said dismount position.

13. An image forming apparatus according to claim 12, wherein said returning means includes a mechanism for disengaging said projection from the slot of said rotatable member, and an elastic member for urging said operation lever into the mounting position.

14. An image forming apparatus according to claim 11, wherein said positioning means includes a presser cam, rotatably supported by said second frame, for assuming a pressing position, in which said image transfer device is pressed against said image retainer through means of said first frame, and a disengage position, in which said image transfer device is released therefrom;

said image transfer device further including:

a first rotator shaft which rotates together with said presser cam;

a second rotator shaft which turns together with said operation lever;

a first disengage gear, partially provided with circumferentially peripheral teeth and fixed to said first rotator shaft;

wherein said first disengage gear, by the turning of said operation lever from the mount position to the dismount position, brings said presser cam from the pressing position into the disengage position of the image transfer device; and said presser cam in the disengage position is prevented by said first disengage gear from being turned by the turning of said operation lever from the mount position to the dismount position; and a second disengage gear engageable with said first disengage gear and fixed to said second rotator shaft; wherein circumferentially peripheral teeth along said second disengage gear are broken by a non-meshing gap, which thereby prevents said operation lever in the mount position from being turned by the rotation of said first rotator shaft.

15. An image forming apparatus according to claim 3, further including manipulation control means for permitting said image transfer device to be mounted into and dismounted from said image forming apparatus when said positioning means is in the third position, and for forbidding the mounting and dismounting of said image transfer device when said positioning means is in either the first or the second position.

16. An image forming apparatus according to claim 15, further including position retaining means for retaining said positioning means in the third position.

17. An image forming apparatus according to claim 16, further including means for returning said positioning means to the second position when said image transfer device is mounted into said image forming apparatus.

18. An image forming apparatus according to claim 3, wherein a coupling face of each of said first and second couplings is partly formed of a flat surface, which flat surface meets a surface sloping circumferentially therefrom in a direction of increasing axial dimension of each said coupling, ending in an abutment shelf substantially perpendicular to and meeting said flat surface; and said abutment shelves of both coupling members are formed such that they can be brought into mutually abutting contact.

* * * * *